Jan. 24, 1961  R. GAUTHIER  2,968,951
CENTRIFUGAL GOVERNORS
Filed March 8, 1957  3 Sheets-Sheet 1

BY

Jan. 24, 1961  R. GAUTHIER  2,968,951
CENTRIFUGAL GOVERNORS
Filed March 8, 1957  3 Sheets-Sheet 2

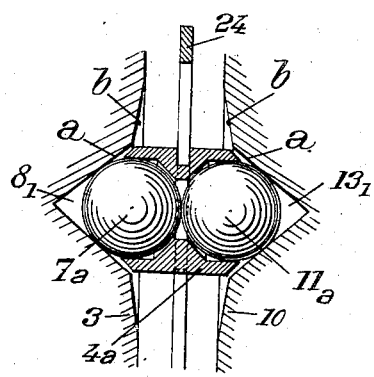
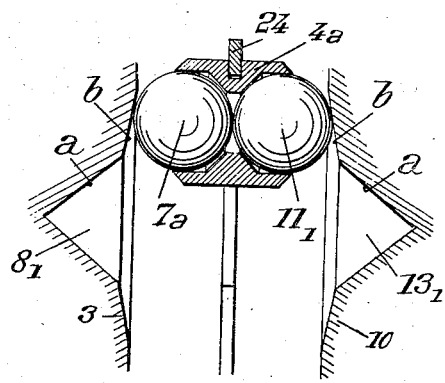
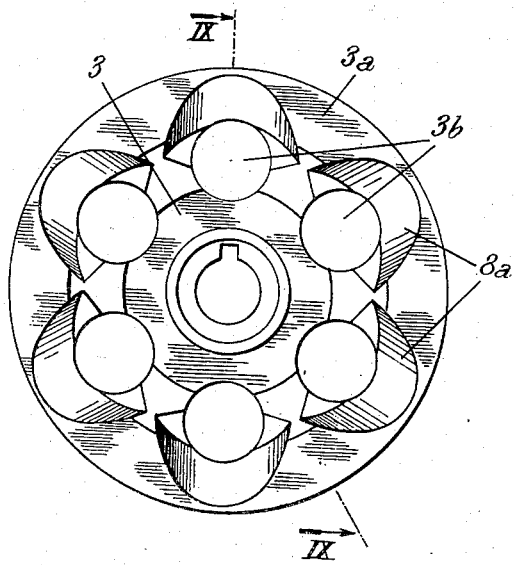
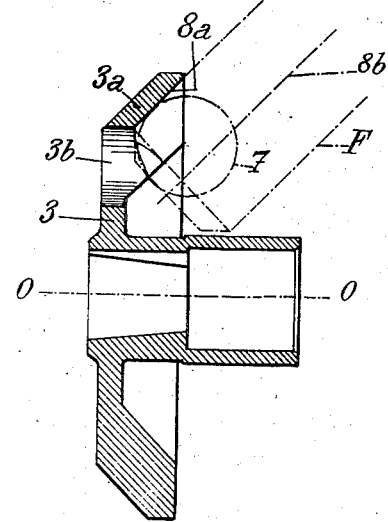

United States Patent Office 2,968,951
Patented Jan. 24, 1961

2,968,951
CENTRIFUGAL GOVERNORS

Robert Gauthier, Saint-Germain au Mont d'Or, France, assignor to Societe Industrielle Generale de Mecanique Appliquee S.I.G.M.A., Paris, France, a society of France Filed Mar. 8, 1957, Ser. No. 644,952
Claims priority, application France Mar. 10, 1956
14 Claims. (Cl. 73—511)

The present invention relates to centrifugal governors and in particular governors for internal combustion engines the injection pump of which is controlled by a centrifugal governor.

The centrifugal governors with which my invention is concerned include, in a frame, two elements, to wit a driving disc and a circular support, disposed side by side and rotating about a common axis, centrifugal weights being slidable radially with respect to said axis, said two elements being slidable relatively to each other parallelly to said axis, in one direction under the action of the centrifugal weights, transmitted by balls interposed between said centrifugal weights and said member, in response to displacements of said centrifugal weights away from said axis and against the yielding action of return means urging said elements in the opposite direction with respect to each other.

According to my invention, said disc is provided on one side thereof with recesses each of which is in the form of a surface constituted by generatrices oblique to said axis, each of said centrifugal weights being provided, on the side thereof facing said side of said dics, with a recess, each of the balls being engaged both in one of the recesses of said disc and in the recess of one of said centrifugal weights, so that said balls both transmit rotation from the driving disc to said support and cause longitudinal displacements of said elements with respect to each other in response to radial displacements of said centrifugal weights with respect to said support, said recesses being so shaped that said balls can have but rolling displacements on the walls of said recesses of said disc.

Preferred embodiments of my invention will be hereinafter described with reference to the accompanying drawings, given merely by way of example and in which.

Figure 5:
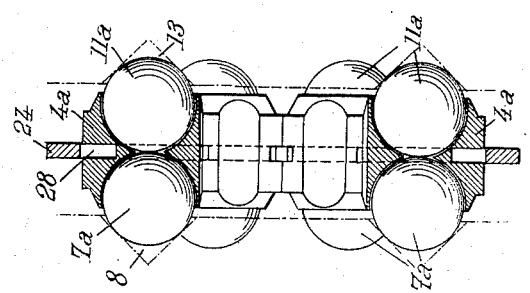
Figure 4:
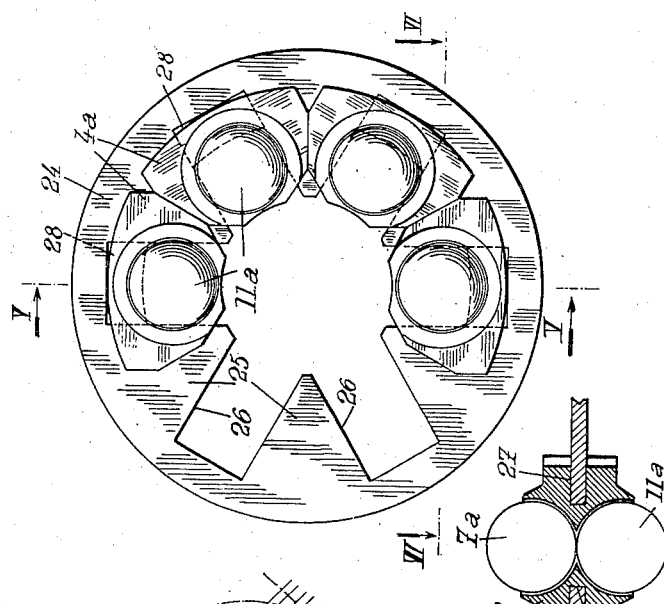
Figure 6:
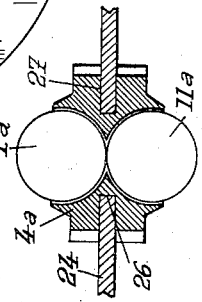

Figs. 4 to 6 relate to another embodiment of the system including the centrifugal weights and their guiding support, which may be substituted to the corresponding part of the centrifugal governor according to the invention, and correspond respectively to an elevational view, a sectional view on the line V—V of Fig. 4 and a sectional view on the line VI—VI of Fig. 4, of said system.

Figs. 7 and 8 are views similar to Fig. 5 and showing a modification, in two different positions respectively, of the centrifugal weights.

Figs. 9 and 10 are respectively a front view and an axial sectional view of a modification of the driving disc of the centrifugal governor made according to my invention.

Figure 1:
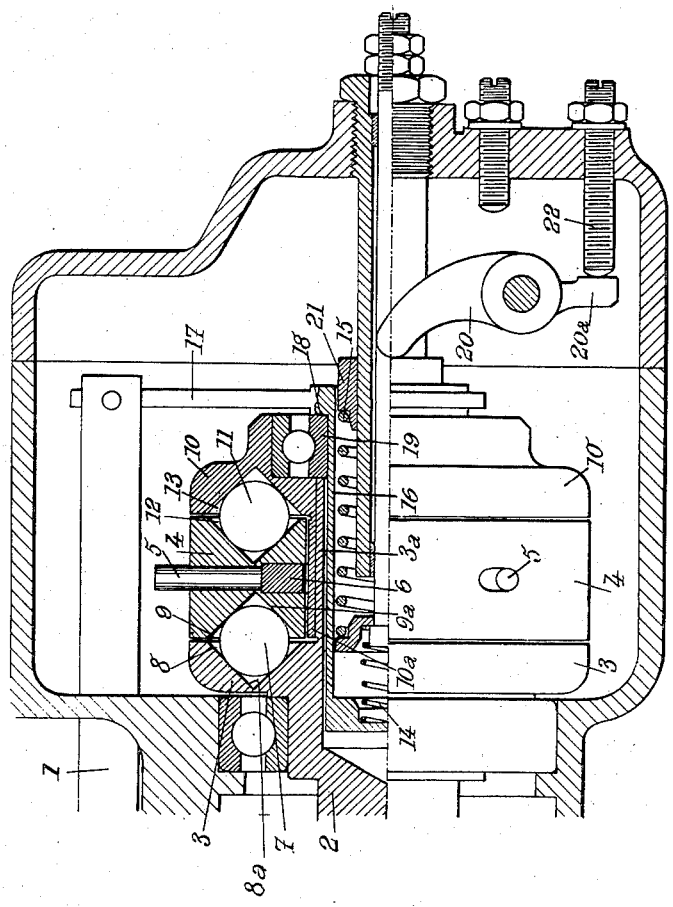
Fig. 1 is a diagrammatic axial sectional view of a centrifugal governor made according to my invention for controlling the rack of an injection pump of a diesel engine.
Figure 2:
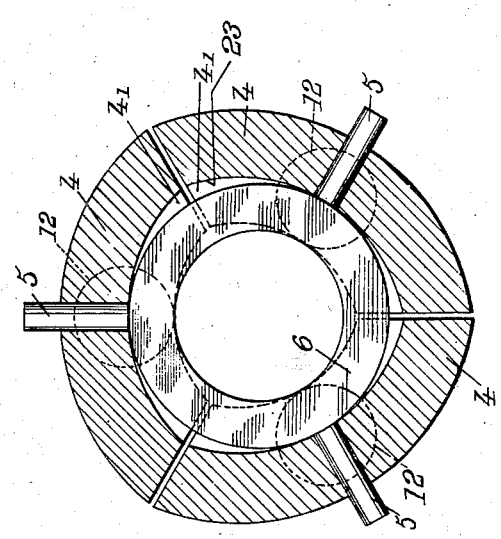
Fig. 2 is a transverse sectional view of the centrifugal masses and of the means for guiding them.
Figure 3:
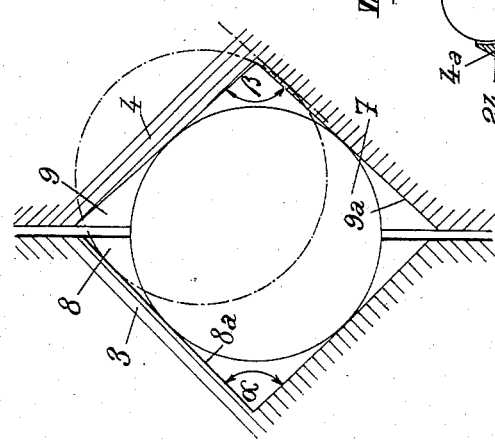
Fig. 3 is a view on an enlarged scale showing a detail of the centrifugal governor of Fig. 1.

The centrifugal governor illustrated by Figs. 1, 2 and 3 is intended to control the injection pump of a diesel engine, the pump regulating means being constituted by a rack 1 which imparts a movement of rotation to the piston of such a pump.

In the construction of Fig. 1, the centrifugal governor proper is driven by a driving shaft 2 which may be constituted by the cam-shaft or the pump-shaft of the engine.

The centrifugal governor includes a driving disc 3 fixed to one of the ends of shaft 2. On the right hand side of said disc 3, there is provided a plurality of centrifugal weights 4 distributed about the axis of the driving shaft, the number of said centrifugal weights being for instance three. Said centrifugal weights 4 are guided, in radial planes with respect to said axis, by a support constituted, in the construction of Figs. 1 and 2, by a ring 6 provided with radial guiding rods 5. Ring 6 can freely rotate about the above mentioned axis and freely move longitudinally along said axis. Every centrifugal weight 4 is slidably fitted on one of the guiding rods 5 and is provided with a groove $4_1$ in which ring 6 is fitted. Therefore, the centrifugal weights can only slide in radial planes.

Between the driving disc 3 and the centrifugal weights 4, I provide balls 7 each engaged in a conical recess 8 provided in disc 3 and in a conical recess 9 provided in one of the centrifugal weights 4. Thus, balls 7 serve to transmit the movement of rotation of disc 3 to the centrifugal weights 4 and also, when centrifugal weights 4 move away from the rotation axis under the effect of the centrifugal weight, said balls 7 roll upon the generatrices $8a$ and $9a$ of recesses 8 and 9, so as to compel the whole of guiding support 5—6 and centrifugal masses 4 to move longitudinally away from disc 3. Due to the fact that balls 7 roll upon the walls of recesses 8 and 9, this longitudinal movement is obtained with a minimum of friction.

Of course I might make use of this longitudinal movement of parts 4, 5 and 6 to actuate rack 1. However, it is more advantageous to double the amplitude of this longitudinal movement by providing, on the other side of parts 4, 5, 6 from the driving disc 3, another disc 10, called "receiver disc" and by providing a second set of balls 11 between centrifugal weights 4 and this disc 10. Conical recesses 12 and 13 are provided in the faces of centrifugal weights 4 and disc 10 which are facing each other so as to accommodate balls 11. It should be noted that the recesses 13 of receiver disc 10 are advantageously replaced by a circular groove of V-shaped cross-section, since balls 11 serve only to transmit and to amplify the longitudinal sliding movement of the centrifugal weight support, without having to transmit a rotation movement to disc 10.

It will be readily understood that if the diameter of balls 7 and 11 and the obliquity of the walls of recesses 8, 9, 12 and 13 which cooperate with balls 7 and 11 have the same value, the amplitude of the longitudinal sliding movement of receiver disc 10 is practically twice the amplitude of the longitudinal sliding movement of ring 6. I thus obtain an amplification of the longitudinal movement without any substantial friction since balls 11 merely roll on the walls of the recesses in which they are placed.

In view of the fact that the amplitude of the longitudinal movement of receiver disc 10 is great, this movement is transmitted directly to rack 1.

From the preceding explanations it results that the movement of balls 7 and 11 must be a rolling movement and said balls must be prevented from sliding radially in the outward direction under the effect of the centrifugal force acting also on said balls. In order to make sure that the displacement of the balls is a rolling displacement, I advantageously give the generatrices $8a$ and $9a$ of recesses 8 and 9 directions which are not parallel but such that these generatrices converge toward each other in the direction where they diverge from the axis of rotation of the system. In other words, the angle $\beta$ (Fig. 3), at the apex of the cone of recesses 9, is slightly greater that the angle $\alpha$ at the apex of the cones formed by recesses 8. In likewise fashion, the conical recesses 12 of centrifugal weights 4 are given an apex angle greater that that of the recesses 13 of the receiver disc 10.

Ring 6 bears upon a sleeve $10a$, integral with the receiver disc 10, and said sleeve $10a$ is rotatably fitted on a sleeve $3a$ integral with guiding disc 3.

Of course, as in any centrifugal governor, a return force must be provided to act upon the centrifugal weights in opposition with the action of the centrifugal force.

In the construction illustrated by Fig. 1, this return force is supplied by a spring system 14—15 which yieldingly opposes the axial sliding displacement of receiver disc 10. This spring system acts in such manner as to urge disc 10 toward ring 6 and ring 6 toward disc 3.

The arrangement of springs 14 and 15 as shown by the drawings makes it possible to house it inside the centrifugal governor, as visible on Fig. 1, which further reduces the space occupied by the governor. Springs 14 and 15 are located inside a sleeve 16 against one end of which spring 14 is applied, whereas the other end of said sleeve 16 is connected through a rod 17 with rack 1. This last mentioned end of sleeve 16 is applied, by its shoulder 18, against a thrust bearing 19 mounted on disc 10. Said thrust bearing therefore transmits the longitudinal movements of disc 10 toward the right to rack 1 and sleeve 16 and, on the other hand, it transmits to disc 10 the axial movements of sleeve 16 toward the left. The action of spring means 14—15 is adjustable by means of a finger 20 which is controlled, for instance, by the driver of the vehicle on which the engine is mounted and which determines the position of a sliding member 21 against which the end of spring 15 is applied. The position of finger 20 shown by Fig. 1 (which position is determined by an abutment 22 against which an extension $20a$ of finger 20 is applied) is that for which the tension of the return spring is maximum.

Preferably, every centrifugal weight 4 is in the form of a circular annular sector. Advantageously, this annular sector is given a radius of curvature higher than the radius of the circle inscribed between the centrifugal masses when they are at minimum distance from their axis of rotation, as shown by Fig. 2. For instance, the curvature of surface 23 which, in the vicinity of the roots of radial rods 5, is applied against the outer cylindrical surface of ring 6, has a radius greater than that of said cylindrical surface. Thus the center of gravity of every centrifugal weight is at a greater distance from the axis of rotation, whereby the effect of the centrifugal force on said weights is increased. Preferably, surfaces 23 are given a radius of curvature such that their center is located on the axis of rotation when the centrifugal weights are at the maximum distance from said axis.

The speed governor which has just been described is sensitive not only to a variation of speed which, due to the corresponding variation of the centrifugal force, varies the distance of the centrifugal weights 4 from the axis of rotation, but it is also responsive to variations of acceleration. This is due to the fact that in the case of a sudden positive or negative acceleration, the inertia of weights 4 in the circumferential direction gives rise to relative angular displacements between said weights and the driving disc 3. Due to the conical shape of recesses 8 and 9, this angular displacement also produces a longitudinal displacement of ring 6 along the axis of rotation. This sensitivity of the speed governor to positive or negative accelerations makes it immediately responsive to any variation of speed.

When the receiver disc 10 is driven in rotation by centrifugal weights 4, the inertia of said disc in the circumferential direction is further added to the inertia of weights 4 in the same direction.

It will be readily understood that a governor as above described has many advantages and in particular the following ones:

(1) There is practically no sliding friction, but only rolling frictions.

(2) The volume occupied by said governor and its weight are greatly reduced.

(3) The longitudinal amplitude of adjustment for a given radial displacement of the centrifugal weights is great, whereby the receiver disc of the governor can be directly fixed to the rack or other driven members.

(4) The speed governor is highly sensitive since the centrifugal weights act also by inertia when positive or negative accelerations take place, so that the time of response to such variations of speed is extremely small.

(5) When, as in the preferred embodiment, a circular groove is provided in receiver disc 10, such V-shaped groove allows, on the one hand, a material temporary slipping of the receiver disc 10 when an acceleration or deceleration (negative acceleration) takes place, thereby reducing the inertia efforts and the oscillations of the receiver disc, and, on the other hand, a reduced permanent slipping of the receiver disc 10 even in the absence of any acceleration and deceleration, due to the frictions in oil of said receiver disc and of the ball-ring 19, thereby reducing the longitudinal friction component of receiver disc 10 on sleeve $3a$.

Figs. 4 to 6 show a modification of the system including the centrifugal weights and their guiding support, said modification representing the preferred embodiment of said system.

In this embodiment, balls $7a$ and $11a$, housed in each centrifugal weight $4a$, are in contact two by two. This compels them to roll upon each other when weights $4a$, under the effect of the centrifugal force, move radially away from the axis of rotation. As in the construction of Figs. 1 to 3, the portions of balls $7a$ and $11a$ which project laterally beyond the surfaces of centrifugal weights $4a$ are housed in conical recesses 8 and 13 provided in the driving disc and the receiver disc, respectively.

Centrifugal weights $4a$ (the weight of which is much smaller than the weight of the balls $7a$ and $11a$) are provided with spherical recesses for the balls, the diameter of these recesses being slightly greater than that of the balls and the two recesses provided in each centrifugal weight communicate with each other so as to make it possible for the two balls to roll upon each other. The depth of every recess is slightly greater than the radius of the balls so that the balls can be held in the recesses while being able to roll therein.

Guiding of the centrifugal weights $4a$ in radial planes is obtained, in the construction of Figs. 4 to 6, by a flat ring 24 provided with inward projections 25 which form between them slideways 26 in which weights $4a$ are slidably guided. Grooves 27 and 28 are provided in the weights $4a$, so as to cooperate with the edges and the end of slideways 26. In the state of rest, centrifugal weights $4a$ and the inner ends of projections 25 of ring 24 bear, for instance, upon a sleeve (not shown on Figs. 4 to 6 analogous to sleeve $10a$ of Fig. 1).

The operation of the governor having its system of centrifugal weights and guiding support modified according to Figs. 4 to 6 is the same as that of the governor of Figs. 1 to 3.

Figs. 7 and 8 show a modification of the construction of Figs. 4 to 6. In the above described embodiment, the generatrix of the conical recesses 8, provided in the driving and receiver discs 3 and 10 along which balls are rolling, is a straight line. Consequently, the ratio of the centrifugal force acting upon the centrifugal weights to the force received by disc 10 remains constant and the ratio of the radial movement of the centrifugal weights to the axial movement of said receiver disc is also constant. In some cases, it may be of interest to obtain a progressive variation of these ratios. In this case, the generatrix of the above mentioned recesses is given the shape of a curved line or of a broken line. Figs. 7 and 8 show the case where this generatrix is constituted by a broken line. Said generatrix is constituted by two portions a and b, the angle made by portion a with the direction of the axis of rotation being smaller than the angle made by portion b with the same direction. In other words, recess 8₁, instead of having the shape of a mere cone, includes a conical portion obtained by revolution of the portion a of the generatrix about the axis of said recess and a frusto-conical portion obtained by revolution of the portion b of the generatrix. As long as balls 7a are in contact with the portion a of the generatrix, the ratio of the forces is relatively small and the ratio of the movements is relatively high, whereas a high ratio of the forces and a low ratio of the movements is obtained as soon as the balls come into contact with the portion b of the generatrices.

The shape of the recesses as just above described permits in particular greater displacements of the receiver disc during preliminary displacements and higher forces with smaller displacements during the working periods. Of course, the effects may be modified at will according to the values chosen for the angles of the different portions of the generatrices.

Figs. 9 and 10 show a driving disc made according to a preferred embodiment of my invention.

In the construction of Figs. 9 and 10, instead of providing the driving disc 3 with conical recesses to receive balls 7, the walls 8a of said recesses are given the shape of portions of cylindrical surfaces. The axes 8b of these cylindrical surfaces are located in planes passing through the axis of disc 3 and they make an acute angle with said axis O—O. Advantageously, these surfaces 8a are formed in a peripheral portion 3a of the driving disc 3, this peripheral portion being of frusto-conical shape and having the same inclination with respect to axis O—O as the axis 8b of the cylindrical surfaces. Furthermore, disc 3 is provided with holes 3b opposite the respective ends of cylindrical surfaces 8a.

The cylindrical surfaces 8a of the recesses are advantageously obtained by means of a cylindrical milling cutter F the outline of which is shown on Fig. 10 by dotted lines. This milling cutter forms the recesses in the periphery 3a of disc 3. This method of forming the desired recesses in disc 3 not only is simple but it has the advantage of making the shape of surfaces 8a independent of the slight differences which may occur in the forward displacement of the milling cutter along its axis, during the cutting operation.

Preferably, the diameter of the cylindrical surfaces 8a, and consequently the diameter of milling cutter F, is greater than the diameter of balls 7, so that the centrifugal weights which are operatively connected with the driving disc through said balls may have not only a movement displacing them radially and axially away from the driving disc, but also an angular movement with respect to said disc. This last possibility gives the governor a high sensitivity to accelerations of the engine on which the governor is mounted.

It should be noted that the receiver disc may be fixed in the axial direction, whereas the driving disc is then both rotated by the driving shaft and movable axially with respect thereto. In this case, the axial displacement of the driving disc serves to control the rack or other driven member.

In a general manner, while I have, in the above description disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A centrifugal governor which comprises, in combination, a frame, two elements consisting of a driving disc and a circular support, disposed side by side and journalled in said frame about a common axis, said two elements being slidable relatively to each other parallelly to said axis, centrifugal weights slidably guided by said support radially with respect to said axis, said driving disc being provided on one side thereof with recesses each of which is constituted by a portion of a circular cylindrical surface the axis of which makes an acute angle with said axis and diverges therefrom toward said support, each of said centrifugal weights being provided with a recess on the side thereof facing said side of said disc, a plurality of balls engaged both in one of said recesses of said disc and in the recess of one of said centrifugal weights, so that said balls both transmit rotation from said driving disc to said support and cause said elements to move longitudinally with respect to each other in response to radial displacements of said centrifugal weights with respect to said support, the diameter of said balls being smaller than the diameter of said cylindrical surface and means for yieldingly opposing the longitudinal displacements of said elements with respect to each other in response to movements of said centrifugal weights away from said axis.

2. A centrifugal governor which comprises, in combination, a frame, two elements, consisting of a driving disc and a circular support respectively, disposed side by side and journalled in said frame about a common axis, said two elements being slidable relatively to each other parallelly to said axis, centrifugal weights slidably guided in said support radially with respect to said axis, said driving disc being provided on one side thereof with a number of recesses equal to the number of said centrifugal weights, each of said centrifugal weights being provided with a recess on the side thereof facing said driving disc, a plurality of spherical balls each engaged both in one of said disc recesses and in one of said centrifugal weight recesses so that said balls both transmit rotation from said driving disc to said support and cause said elements to move longitudinally with respect to each other in response to radial displacements of said centrifugal weights with respect to said support, the wall of each of said disc recesses being in tangential contact with a portion of the ball engaged in said recess located at a greater distance from said axis than the center of said last mentioned ball, said wall being in the form of a portion of a developable surface of revolution the axis of which intersects said first mentioned axis and the section of which by a plane passing through both of said axes is a straight line diverging from said axis toward said support, the circular sections of said surface, at least for a multiplicity of said sections, having respective diameters greater than the diameter of said balls, and means for yieldingly opposing longitudinal displacements of said elements with respect to each other in response to movements of said centrifugal weights away from said axis.

3. A centrifugal governor according to claim 2 in which said recesses in said driving disc are in the form of conical surfaces having their respective axes parallel to said axis.

4. A centrifugal governor according to claim 2 in which said recesses, both in said driving disc and in said centrifugal weights are in the form of conical surfaces having their respective axes parallel to said axis.

5. A centrifugal governor according to claim 2 in which the respective generatrices of a recess in said driving disc and of the recess in a centrifugal weight between which a ball is held converge toward the direction in which they diverge from said axis.

6. A centrifugal governor according to claim 2 in which said recesses, both in said driving disc and in said centrifugal weights are in the form of conical surfaces having their respective axes parallel to said axis, the apex angle of each of the conical recesses in said centrifugal weights being slightly greater than the apex angle of each of the conical recesses in said driving disc.

7. A centrifugal governor which comprises, in combination, a frame, two elements consisting of a driving disc and a circular support disposed side by side and journalled in said frame about a common axis, said two elements being slidable relatively to each other parallelly to said axis, centrifugal weights slidably guided in said support radially with respect to said axis, said driving disc being provided on the side thereof facing said support with a number of recesses equal to the number of said centrifugal weights, each of said centrifugal weights being provided with a recess on the side thereof facing said disc, a plurality of spherical balls each engaged both in one of said disc recesses and in one of said centrifugal weight recesses, so that said balls both transmit rotation from said driving disc to said support and cause said elements to move longitudinally with respect to each other in response to radial displacements of said centrifugal weights with respect to said support, the wall of each of said disc recesses being in tangential contact with a portion of the ball engaged in said recess located at a greater distance from said axis than the center of said last mentioned ball, said wall being in the form of a portion of a developable surface of revolution the axis of which intersects said first mentioned axis and the section of which by a plane passing through both of said axes is a straight line diverging from said axis toward said support, the circular sections of said surface, at least for a multiplicity of said sections, having respective diameters greater than the diameter of said balls, a receiver disc journalled in said frame about said axis, said receiver disc being located on the other side of said support from said driving disc and being slidable relatively to said support parallelly to said axis, said receiver disc being provided on the side thereof facing said support with a circular groove having lateral walls forming in section by a plane passing through said first mentioned axis an acute angle, each of said centrifugal weights being provided with a recess formed on the side thereof facing said receiver disc and communicating with said recess provided in said centrifugal weight on the side thereof facing said driving disc, a plurality of balls engaged each both in the last mentioned recesses of one of said centrifugal weights and in said at least one recess of said receiver disc, so that said balls cause said support and said receiver disc to move longitudinally with respect to each other in response to radial displacements of said centrifugal weights with respect to said support, and means for yieldingly opposing longitudinal displacements of said two discs with respect to each other in response to movements of said centrifugal weights away from said axis.

8. A centrifugal governor which comprises, in combination, a frame, two elements consisting of a driving disc and a circular support disposed side by side and journalled in said frame about a common axis, said two elements being slidable relatively to each other parallelly to said axis, centrifugal weights slidably guided by said support radially with respect to said axis, said driving disc being provided on the side thereof facing said support with recesses each of which is in the form of a portion of a cylindrical surface the axis of which diverges from said axis toward said support, each of said centrifugal weights being provided with a recess on the side thereof facing said driving disc, a plurality of balls engaged both in one of said recesses of said disc and in the recess of one of said centrifugal weights, the diameter of said balls being smaller than the diameter of said cylindrical surface, so that said balls both transmit rotation from said driving disc to said support and cause said elements to move longitudinally with respect to each other in response to radial displacements of said centrifugal weights with respect to said support, a receiver disc journalled in said frame about said axis, said receiver disc being located on the other side of said support from said driving disc and being slidable relatively to said support parallelly to said axis, said receiver disc being provided on the side thereof facing said support with a circular groove having lateral walls forming in section by a plane passing through said axis an acute angle, each of said centrifugal weights being provided with a recess on the side thereof facing said receiver disc and communicating with said recess provided in said centrifugal weight on the side thereof facing said driving disc, a plurality of balls engaged each in said groove of said receiver disc and in the last mentioned recess of one of said centrifugal weights, so that said balls cause said support and said receiver disc to move longitudinally with respect to each other in response to radial displacements of said centrifugal weights with respect to said support, and means for yieldingly opposing longitudinal displacements of said two discs with respect to each other in response to movements of said centrifugal weights away from said axis.

9. A centrifugal governor according to claim 8 in which said means for yieldingly opposing the longitudinal displacements of said discs with respect to each other include spring means for urging said receiver disc toward said support and spring means for urging said support toward said driving disc.

10. A centrifugal governor according to claim 8 in which the two recesses provided in each of said centrifugal weights, on opposed sides thereof respectively, are located opposite each other and communicate with each other so that the two balls located in said last mentioned recesses respectively roll on each other, said last mentioned recesses having their walls in the form of portions of spheres of a diameter slightly greater than those of the respective balls housed therein and the depth of each of said housings being greater than the radius of the corresponding ball.

11. A centrifugal governor according to claim 8 in which the two recesses provided in each of said centrifugal weights, on opposed sides thereof respectively, are located opposite each other and communicate with each other so that the two balls located in said last mentioned recesses respectively roll on each other, said support being a flat ring with inward projections forming slideways for said centrifugal weights.

12. A centrifugal governor according to claim 7 in which said support is a ring with radial rods extending outwardly therefrom, said centrifugal weights being provided with radial holes for sliding engagement on said rods and with grooves for engagement on said ring, said ring being freely rotatable and longitudinally slidable with respect to said disc.

13. A centrifugal governor according to claim 2 in which the centrifugal weights are in the form of annular sectors, the distance from the center of gravity of each annular sector, to the geometrical center of said sector being greater than the radius of the circle passing through the centers of gravity of said centrifugal weights when they are located in their positions closest to the axis of rotation.

14. A centrifugal governor according to claim 7 in which the two recesses provided in each of said centrifugal weights on opposite sides thereof respectively are located opposite each other and communicate with each other so that the two balls located in said last mentioned recesses respectively roll on each other.

(References on following page)

References Cited in the file of this patent

UNITED STATES PATENTS

| | | |
|---|---|---|
| 1,304,672 | Fisher | May 27, 1919 |
| 1,714,748 | Wright | May 28, 1929 |
| 2,053,514 | Broders | Sept. 8, 1936 |
| 2,346,359 | Claus | Apr. 11, 1944 |
| 2,375,639 | Falk | May 8, 1945 |
| 2,656,175 | Lee | Oct. 20, 1953 |
| 2,685,440 | Freeman | Aug. 3, 1954 |

FOREIGN PATENTS

| | | |
|---|---|---|
| 471,853 | Great Britain | Sept. 10, 1937 |